United States Patent [19]
Affeldt

[11] 3,967,977
[45] July 6, 1976

[54] CLOSURE FOR GALVANIC DRY CELLS

[75] Inventor: Richard B. Affeldt, Cleveland, Ohio

[73] Assignee: Union Carbide Corporation, New York, N.Y.

[22] Filed: Mar. 28, 1975

[21] Appl. No.: 563,133

[52] U.S. Cl. ............................. 136/133; 136/169
[51] Int. Cl.² ...................................... H01M 2/04
[58] Field of Search .................... 136/133, 169, 177

[56] References Cited
UNITED STATES PATENTS

| | | | |
|---|---|---|---|
| 2,546,379 | 3/1951 | Woodring et al. | 136/133 |
| 3,320,094 | 5/1967 | Yamamoto et al. | 136/133 |
| 3,623,915 | 11/1971 | Pun et al. | 136/133 |
| 3,837,921 | 9/1974 | Henssen | 136/177 |
| 3,861,962 | 1/1975 | Harada et al. | 136/133 |

Primary Examiner—Donald L. Walton
Attorney, Agent, or Firm—Cornelius F. O'Brien

[57] ABSTRACT

A galvanic dry cell includes a cylindrical container having an open end provided with a closure having a centrally disposed depending neck adapted to be slid over and secured to the carbon rod of the cell and a peripherally disposed skirt adapted to be slid on and secured to the upper rim of the container thereby providing a closure seal for the container.

10 Claims, 8 Drawing Figures

CLOSURE FOR GALVANIC DRY CELLS

FIELD OF THE INVENTION

This invention relates to sealed galvanic dry cells, and more particularly to a seal closure for the open end of a cylindrical container used in such dry cells, said closure having a centrally disposed tubular neck adapted to be snugly slid over and adhesively secured to the current collector (carbon rod) of the cell an a peripherally disposed tubular skirt or apron adapted to be snugly slid on and adhesively secured to the upper rim of the container thereby providing a seal for the container.

BACKGROUND OF THE INVENTION

Conventional galvanic dry cells for use in flashlights, toys or other sundry devices generally comprise a cylindrical container, such as a zinc anode can, with a depolarizer mix filling most of the container and having a carbon rod in the center which functions as the current collector for the depolarizer mix. The cells are generally sealed by inserting a support washer over the cathode depolarizer mix and then dispensing hot molten asphalt onto the washer thereby providing an asphalt seal for the cells while also providing an airspace above the depolarizer mix and below the asphalt seal to accommodate the discharge gases an exudate of the cells.

Although asphalt seals have been employed with some success in sealing galvanic dry cells, they do have a number of drawbacks or disadvantages. For example, several assembly procedures are required such as placing a support washer down into the cell, pouring an asphaltic pitch onto the support washer, placing a vent washer on top of the asphaltic pitch and then finally placing a terminal cap on top of the cell and locking it in place. The vent washer is usually required to prevent the terminal cap from becoming embedded in the pitch which could possibly result in forming a gastight seal which could prevent venting. In addition, it is possible that the inside surface of the container could become dirty due to mercury contamination, prior to dispensing the asphaltic pitch. This could result in a pseudo-seal which, over a period of time, could eventually lead to moisture loss from the cell and/or oxygen ingress to the cell because of insufficient adhesion of the pitch to the can or container. It is also possible that during the heating of the asphalt pitch to cause a meniscus to form at the can-asphalt interface, pin holes may form in the pitch as a result of expansion of the air in the void volume below the support washer which would allow moisture loss and/or oxygen ingress to the cell. Another disadvantage in the use of asphalt seals is that they physically take up a relatively large space in the cell thereby limiting the size of the airspace into which the reaction products of the cells can discharge. In addition, asphalt seals are not particularly suited for high temperature environments since the seal at the asphalt-can interface is subject to degradation at high temperatures which could possibly cause paths through which moisture (loss) and/or oxygen (ingress) could travel.

In the above-described cells, the venting of the gases from within the cell can take place through a porous current collector such as a carbon rod or the like. Although a properly prepared asphalt seal will effectively minimize electrolyte or moisture loss through evaporation and minimize air or oxygen ingress to the cells, the assembly and quality control techniques required to insure good seals are rather expensive and time consuming. The finished cells that do not meet the minimum quality standards for one reason or another are usually disassembled or detubed so that the raw cell components can be reused. However, in constructions where the container is adhered by asphalt or the like to the outer finish, recovery of the raw cell components is messy and expensive. Furthermore, when a top centering seal washer is employed as part of the finished cell, the detubing operation (removal of the outer jacket) may disturb this centering washer which in turn may cause the depolarizer mix contact to be somewhat loosened which could result in loss of amperage.

The object of the present invention is to provide a one piece closure for a dry cell wherein the closure replaces several components of the conventional cell and is capable of sealing the cell.

Another object of the present invention is to provide a one piece closure for galvanic dry cells having a peripheral skirt or apron adapted for sliding upon and being adhesively secured to the upper rim at the open end of the container (anode) of the cell and a centrally disposed tubular neck adapted for sliding over and being adhesively secured to the current collector (carbon rod) of the cell.

Another object of the present invention is to provide a closure for a galvanic dry cell having a top surface contour fabricated to conform to the bottom surface contour of the metal terminal cap of the cell so as to provide a maximum airspace above the depolarized mix of the cell and below the closure.

Another object of the present invention is to provide a closure for a galvanic dry cell having a peripheral skirt adapted for snugly sliding upon and adhesively securing to the upper rim at the open end of the container (anode) of the cell and a centrally disposed opening adapted to slide over the center metal terminal cap of a two-piece terminal cover with a portion of the inner bottom surface of the closure adhesively secured to the top surface of a radially outward flange depending from the bottom of the metal terminal cap.

Another object of the invention is to provide a closure for a galvanic dry cell having a peripheral skirt adapted to snugly slide upon and be adhesively secured to the upper outer rim at the open end of the cell container that has been necked or crimped in to allow for the thickness of the skirt of the closure thereby maintaining an overall uniform container diameter for the cell and having a centrally disposed opening adapted to slide over and be adhesively secured to the current collector of the cell.

Another object of the invention is to provide a closure for galvanic dry cells which can easily and inexpensively be assembled on such cells.

SUMMARY OF THE INVENTION

The invention broadly relates to a galvanic cell comprising in combination a cylindrical container having an open end, a bottom insulator in the bottom of said container, a separator lining the vertical wall of said container, an electrode comprising a depolarizer mix disposed within said container and separated therefrom by said bottom insulator and separator, a current collector centrally embedded in said depolarizer mix and a closure covering the open end of said container, said closure having a tubular neck at its center and a tubular skirt at its periphery and being disposed such that the upper portion of the current collector passes through and is adhesively secured to the internal wall defining said tubular neck and the peripheral tubular shirt of the closure contacts and is adhesively secured to the upper rim at the open end of said container thereby providing a seal for said cell.

Another embodiment of this invention for use with a galvanic dry cell employing a two-piece metal terminal cover comprises a closure having a peripheral tubular skirt for sliding upon and being adhesively secured to the upper rim at the open end of the cell container and having a centrally disposed opening adapted to slide over the center metal terminal cap of the two-piece terminal cover such that a portion of the inner bottom surface of the closure will rest upon and be adhesively secured to the top surface of a radially outward flange depending from the bottom of the center terminal cap. A conventional annular terminal or closure plate could then be placed on top of the closure whereupon the peripheral edge of the annular plate could be locked in engagement with the external tubular jacket of the cell in a conventional manner.

The closure of this invention has to be made of an insulating material such as plastic, e.g., polyethylene, polypropylene, rigid vinyl, polycarbonate, high impact polystyrene, copolymers made from acrylonitrile, butadiene and styrene (ABS) and nylon. Of the above, polyethylene would be the preferred material and preferably at least the surface of the polyethylene to be adhesively secured to the container and the current collector should be corona treated so as to improve the surface adhesion characteristics of the polyethylene. A suitable process for corona treating polyethylene is disclosed in a commonly assigned U.S. Pat. No. 3,914,521 by T. R. Beatty et al. titled "Heat-Treated Corona-Treated Polymer Bodies And A Process For Producing Them".

Adhesives suitable for use in securing the closure to the upper rim of the container and to the current collector can be any adhesive that will not adversely react with either the closure material or the cell components and which will secure the closure to the respective cell components. Suitable adhesives are disclosed in the textbook titled "Handbook of Adhesives" edited by Irving Skeist-Reinhold Publishing Corp. New York (1962). Specific adhesives suitable for use in this invention are the polyamide resins which are either the thermoplastic heat seal or heat-activated adhesives or the thermoset, structural adhesives.

Another class of suitable adhesives is the fatty polyamides which are produced from dibasic fatty acids. As defined in the "Encyclopedia of Polymer Science and Technology" Vol. 10, Interscience Publishers, a division of John Wiley & Sons, Inc., fatty polyamides are condensation products of di-and polyfunctional amines and di-and polybasic acids obtained by the polymerization of unsaturated vegetable oil acids or their esters. Fatty polyamide adhesives, in addition to being excellent adhesives, also resist wetting by alkaline electrolytes and therefore can retard "creep" of such electrolytes within or from the cells over a long period of time. The use of fatty polyamides in galvanic cells is disclosed in U.S. Pat. No. 3,922,178 by Jerrold Winger which is a continuation of application Ser. No. 167,678 filed on July 30, 1971, now abandoned.

One of the primary requirements of the adhesive for use in this invention is that it effectively provides a leakproof seal at pressures of about 5 psig (gage) and above. Specific adhesives suitable for use in this invention are cold setting cyanoacrylate adhesives available commercially as "Eastman 910" from the Eastman Kodak Co. in New York, hot melt adhesives available commercially as "Eastman A 40-S" also from Eastman Kodak Co. and hot melt fatty polyamide adhesives available commercially as "Swift's 610 Hot Melt Adhesive" from the Swift Chemical Co. in Illinois.

Figure 1:
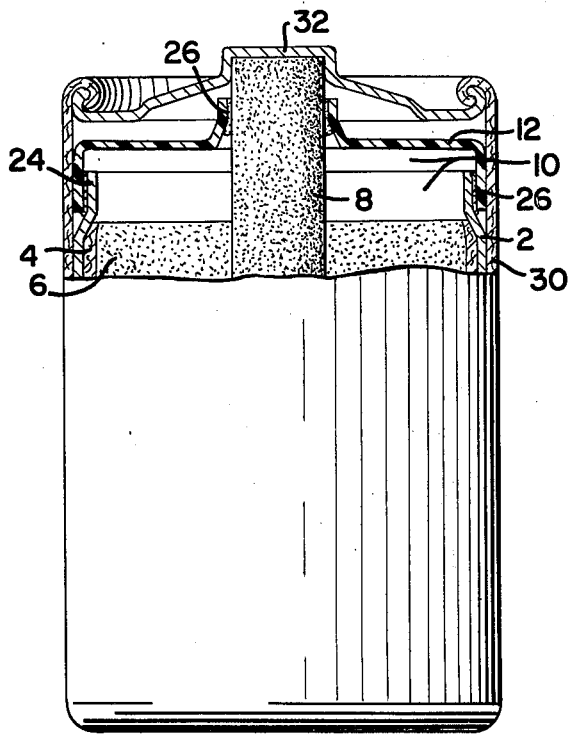
FIG. 1 is an elevational view, partly in cross-section, of a primary galvanic dry cell incorporating an embodiment of the seal closure of the invention.
Figure 2:
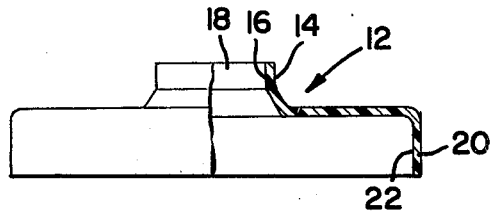
FIG. 2 is a vertical view, partly in crosssection, of the seal closure used in the dry cell shown in FIG. 1 prior to cell assembly.

Referring to the drawing and particularly to FIGS. 1 and 2, there is shown a galvanic dry cell embodying the invention. The dry cell includes a cylindrical container 2 which is made of an electrochemically consumable metal such as zinc and which serves as the anode of the cell. Included in container 2 are an insulator disc (not shown) disposed at the botton of the container 2, a separator 4 lining the vertical wall of the container, a cathode electrode comprising a depolarizer mix 6 disposed within but separated from said container by the insulator disc and the separator 4 and a current collector 8 centrally embedded in the depolarizer mix 6. The insulator disc could be made of plastic or any other suitable insulating material. The separator 4 may comprise a thin electrolyte paste layer or may be a thin film separator containing electrolyte, e.g., a thin bibulous paper coated with an elecrolyte gel paste. The cathode depolarizer mix 6 is an electrochemically active cell component and may contain, for example, manganese dioxide, a conductive material such as carbon black or graphite and an electrolyte. The depolarizer mix 6 is usually molded around a central carbon cathode collector rod 8 before being inserted into the cell container or the depolarizer mix 6 could be first inserted into the container 2 whereupon the current collector 8 could then be forced into the mix. A conventional center washer (not shown) could be employed to maintain the current collector 8 in an upright axial position.

The top of the cathode depolarizer mix 6 is disposed a fixed distance below the open end of the cell container 2 to provide the usual airspace 10 to accommodate any liquid spew that may be formed during cell storage and/or cell discharge.

An electrically insulating closure 12 is provided for sealing the open cell of the cell container 2. As best shown in FIG. 2, closure 12 is formed as a disc-like member having an upward projected tubular neck 14 whose internal wall 16 defines an opening 18. At the periphery of the closure 12 is a downward depending tubular skirt or apron 20 having a vertical internal wall 22. As shown in FIG. 1, the diameter of the neck 14 of closure 12 is made such as to provide a snug sliding fit over current collector 8 and the diameter of the depending skirt 20 is made such as to provide a snug sliding fit with the upper rim portion 24 of container 2. Preferably the rim portion 24 of container 2 should be crimped or necked in to allow for the thickness of the skirt so as to provide an overall uniform raw cell diameter as shown in FIG. 1. A layer of suitable adhesive 26 is disposed between wall 16 of neck 14 and the outer surface of current collector 8 and between wall 22 of skirt 20 and the outer surface of crimped rim portion 24 of container 2. The adhesive may be applied to inner walls 16 and 22 of closure 12 and/or to the corresponding surface of the current collector 8 and the crimped rim portion 24 of the container 2, respectively. It should be noted that the adhesive joint for the skirt 20 can preferably be made with the outside surface of the container which is clean, or can easily be made so, as compared with the inside surface of the container which could be contaminated with the ingredients of the depolarizer mix during its insertion into the container.

The length of the skirt 20 and the neck 14 must be long enough to insure a reliable seal area. For example, the length of the skirt for D size cells could vary between about 3/16 inch and ⅝ inch and preferably be about ⅜ inch while the length of the skirt for C size cells could vary between about 3/16 inch and ⅝ inch and preferably be about 3/10 inch. The length of the closure neck could vary depending on the diameter of the current collector rod. For example, the length of the closure neck could vary between about 1/16 inch and about ¼ inch for current collector having a diameter of about 5/16 inch. However, when vacuum drawing techniques are employed to fabricate the closure of this invention, the length of the neck must not be drawn too deeply since it may result in material thinning at the neck radius which could decrease the strength of the neck to a degree that moisture retention within theh cell would be jeopardized. Preferably, the neck radius could be chamfered so as to provide space for receiving a reservoir of sealant thereat so as to further insure a good seal.

The material thickness of the closure can vary although a thickness between about 0.005 inch and about 0.06 inch has been found acceptable with a thickness about 0.02 inch being preferable. Closure material thickness less than about 0.005 inch would be insufficient to provide a good seal while a material thickness above about 0.06 inch would only result in decreasing the airspace in the cell while increasing the cost of the cell.

As shown in FIG. 1, with the closure 12 in place an effective fluid-tight seal around the open end of the cell container 2 is formed which effectively seals the raw cell against the escape of electrolyte and/or moisture by evaporation and seals it against the ingress of air and oxygen from the atmosphere. As stated above, the sealed raw cell could vent through the porous current collector such as a carbon rod.

The cell proper (i.e. raw cell) with the closure 12 locked in place at the open end of the cell container 2 is finished by encasing it within an outer cell assembly including an outer tubular non-corrodible jacket 30 suitably made of a fibrous material such as kraft paper. The upper end of the tubular jacket 30 extends beyond the closure 12 and is locked in engagement with the outer peripheral edge of a one piece metallic top cover plate 32 in the conventional manner.

The outer cell assembly includes means for venting any gas released from inside the cell container 2 to the outer atmosphere. Such means may be provided, for example, by making the locked engagement between the top cover plate 32 and the jacket 30 permeable to gas.

Figure 3:
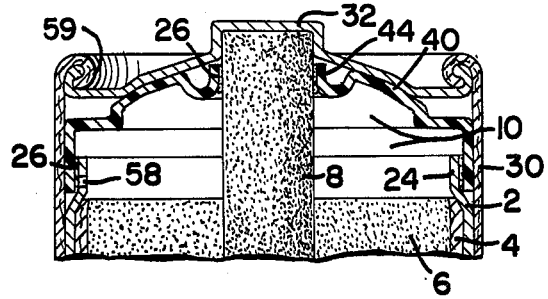
FIG. 3 is an elevational cross-sectional view of the top portion of a dry cell illustrating another embodiment of the invention.
Figure 4:
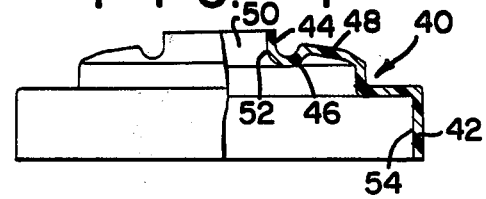
FIG. 4 is a vertical view, partly in cross-section, of the seal closure used in the dry cell shown in FIG. 3 prior to cell assembly.

FIGS. 3 and 4 show another embodiment of the invention having some similar components as the cell shown in FIG. 1 and consequently identified with the same numerical designation, with the distinction being the use of a closure 40 having a different contour. Specifically, closure 40 has a peripheral depending skirt 42 and a centrally disposed neck 44 formed or defined by a U-shaped segment 46 of the closure 40. The relatively flat surface 48 disposed between the U-shaped segment 46 and proximal the depending tubular skirt 42 is contoured to the shape of the bottom surface of the one piece terminal cover plate 32 so as to provide a maximum airspace 10 between the depolarizer mix 6 and the closure 40. The U-shape segment 46 provides flexibility to the neck 44 so as to facilitate the insertion of the current collector into and through the opening 50 in the neck 44. As discussed above, the internal wall 52 of neck 44 is adhesively secured to the current collector 8 and the internal wall 54 is adhesively secured to the outer crimped rim 24 of container 2.

Figure 5:
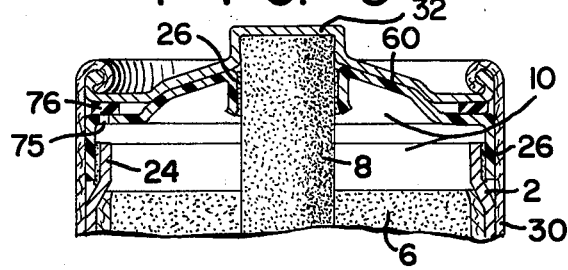
FIG. 5 is an elevational cross-sectional view of the top portion of a dry cell illustrating another embodiment of the invention.
Figure 6:
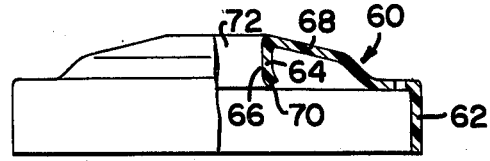
FIG. 6 is a vertical view, partly in cross-section, of the seal closure used in the dry cell shown in FIG. 5 prior to cell assembly.

FIGS. 5 and 6 show another embodiment of the invention with similar numerically identified parts as shown in FIG. 1 except that a different closure 60 is employed. Specifically, closure 60 has a peripheral depending skirt 62 and a centrally disposed neck 64 defined by a downward depending tubular wall 66. The surface 68 disposed between depending tubular wall 66 and proximal the depending tubular skirt 62 is contoured to the shape of the bottom surface of the one piece terminal cover plate 32 so as to provide a maximum airspace for the cell. The extremity 70 of wall 66 is flared outward to facilitate the insertion of the current collector into and through the opening 72 in neck 64. As stated above, the closure is adhesively secured at the neck 64 to current collector 8 and at the skirt 62 to the outer upper crimped rim 24 of the container 2.

Figure 7:
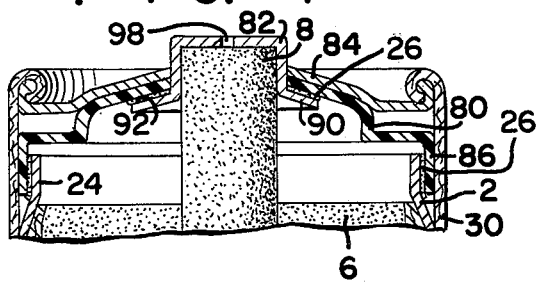
FIG. 7 is an elevational cross-sectional view of the top portion of a dry cell illustrating another embodiment of the invention.
Figure 8:
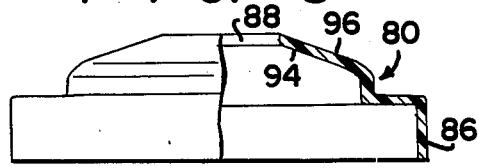
FIG. 8 is a vertical view, partly in cross-section, of the seal closure used in the dry cell shown in FIG. 7 prior to cell assembly.

FIGS. 7 and 8 show another embodiment of the invention with similar numerically identified parts as shown in FIG. 1 except that a different closure 80 and a two-piece terminal cover 82–84 are employed. Closure 80 has a peripheral depending skirt 86 and a centrally disposed opening 88. The terminal cap 82 of the two-piece cover is provided with an outwardly flanged lower end 90 the top surface 92 of which seats against and is adhesively secured to the closure's bottom surface 94 proximal the opening 88. As discussed above in conjunction with FIGS. 5 and 6, the peripheral skirt 86 is secured to the outer upper crimped rim 24. The surface 96 disposed between the opening 88 and proximal the depending skirt 86 is contoured to the bottom shape of an annular metallic top cover plate 84 which forms the second part of the two-piece terminal cover. With the terminal cap 82 fitted tightly over the top end of the current collector 8 and adhesively secured to closure 80 and the latter adhesively secured to rim 24, the annular metallic top cover plate 84 is positioned on top of closure 80 and its outer peripheral edge is locked in engagement with the upper end of the tubular jacket 30. Venting is through hole 98 in cap 82.

It may be advisable in some applications to put an air vent hole in the top of the closure for assembly purposes. The reason for this is that as the closure is placed on the raw cell, the leading edge of the skirt and neck of the closure come in contact with the container and the current collector, respectively, thereby causing the air within the raw cell to be trapped. As the closure continues to be pushed to its final position, the air trapped in the cell is reduced in volume thereby causing an increase in pressure within the airspace of the cell. It is this increase in pressure, usually about 15 psi, that could cause air leakage passages between the container and the closure and/or between the current collector and the closure. The adhesive may flow back to seal off any air passages so formed but if it does not then permanent passages are created. The placing of a vent hole in the top of the closure would eliminate this problem since the vent hole would act as a pressure relief for the entrapped gas. The vent hole could subsequently be sealed up or used as part of a venting mechanism integral with the finished cell. Alternately, trapped air could be vented by a hole in the container wall near the top or by a short slot in the current collector. Both of these openings could be disposed such that when the cover is fully seated, the holes would be sealed off by the walls of the closure. One such hole is shown in FIG. 3 and designated as 58.

It is also within the scope of this invention to employ a wax fillet at the top curl where the edge of the terminal plate and top of the jacket are spun as shown in FIG. 3 and designated as 59. In addition, a spacer ring made of plastic or the like could be disposed radially outward between the top curl and the top surface of the closure as shown in FIG. 5 and designated 76. This spacer ring would provide a more secure seat for the closure and a seal for venting hole 75 hereinafter described.

Thus the invention provides a seal closure for the open end of a cylindrical container used in sealed galvanic dry cells which requires the very minimum number of parts and which is, therefore, relatively inexpensive to manufacture. The closure can be easily and accurately assembled during manufacture of the dry cells and gives highly reliable and reproducible results in containing and confining gases and cell exudate during cell storage and discharge. Moreover, the closure when used in a dry cell employing an outer cell assembly including a tubular jacket, is not exposed to external pressure or impact and is, therefore, less prone to accidental damage.

The closure of this invention offers a number of advantages such as:

1. The raw cell may be aged independent of the jacket;
2. The closure would limit moisture loss and oxygen ingress to the cell;
3. The sealant could be on the outside of the container (zinc) rather than on the inside, thus a potentially better seal is formed because the outside of the container can be kept clean and free of contamination from the depolarized mix or the like;
4. The sealant provides an area contact rather than a line contact, thus an increased leakage resistance path;
5. A reservoir could be provided for the electrode sealant if the radius on the closure is suitably selected or if it is chamfered;
6. The closure allows appearance rejects to be reclaimed without disturbing the raw cell assembly, thus a potential reduction of service loss;
7. The closure may be thin to provide minimum material cost and can be pressure vacuum formed at high production rates;
8. Sealant may be applied directly to the container rather than the inside of the closure, thus providing a process improvement for assembling cells;
9. Minimum sealant would be needed because of the close fit between the closure and cell components (i.e., currently collector and container);
10. The closure can be assembled directly on the raw cell rather than as part of the jacket assembly;
11. The closure system lends itself to one-piece metal cover finish, two-piece metal or plastic cover with paper or plastic tube finish; and
12. The closure can provide an increase in void volume of the raw cell for spew containment or an increase in mix height and service capacity compared to an asphalt sealed cell.

A resealable vent mechanism suggested by Dennis W. McComsey which could be used in this invention would comprise placing at least one vent hole 75 at the peripheral top area of the closure of this invention and then placing a suitable sealing washer or ring made of poly-laminated kraft, neoprene rubber, polystyrene or the like above the vent hole(s). The washer could be secured between the top curl where the terminal cover and jacket are spun together and the outer peripheral surface of the closure as shown in FIG. 5 for washer 76. This resealable vent mechanism would operate such that a buildup of internal pressure would cause an upward movement of the washer and curl assembly segment thereby permitting the cell to vent off evolved gases from the airspace of the cell. When the internal (below the closure and above the depolarizer mix) and external atmosphere pressures have equilibrated, the washer and top curl will become firmly reseated over the vent hole(s) thereby sealing the said hole(s). This type of venting mechanism can be controlled (pressure at which the seal vents) by adjusting the pressure on the venting washer through an adjustment of the crimp height of the curl or by varying the washer thickness and/or material.

EXAMPLE I

Thirty D size raw cells (without the tubular jacket and top terminal cover cap) were constructed substantially as shown in FIG. 3. Specifically, the cells were fabricated using a zinc can, a kraft paper bottom insulator disposed in the bottom of the can, a separator of starch coated paper lining the vertical wall of the zinc can, a positive electrode of depolarizer mix composed of manganese dioxide, carbon black and LeClanche electrolyte disposed in and separated from the zinc can by the bottom separator and the vertical lining and a porous carbon rod centrally embedded in the depolarizer mix. A polypropylene closure was placed over the open end of the zinc can and using a Eastman 910 adhesive the internal wall of the neck of the closure was adhesively secured to the carbon rod and the internal wall of the peripheral skirt of the closure was adhesively secured to the outer upper crimped rim of the zinc can. The cells were stored for 14 days at 54°C. and some were discharged across a load of 2.25 ohms for 10 hours. The cells were visually examined and found to exhibit effectively no leakage of liquid spew from within the cell.

It is to be understood that other modifications and changes to the embodiments of the invention herein shown and described can also be made without departing from the spirit and scope of the invention.

What is claimed is:

1. A galvanic cell comprising in combination a cylindrical container having an open end, an electrode comprising a depolarizer mix disposed within said container and separated therefrom by a separator, a current collector centrally embedded in said depolarizer mix and a closure covering the open end of said container, said closure having a tubular neck at its center and a tubular skirt at its periphery and being disposed such that the upper portion of the current collector passes through and is adhesively secured to the internal wall defining said tubular neck and the peripheral tubular skirt of the closure is disposed outside and is adhesively secured to the upper rim at the open end of said container thereby providing a closure seal for said cell and wherein the thickness of said closure is between about 0.005 inch and about 0.06 inch.

2. The galvanic cell of claim 1 wherein said upper rim is inwardly crimped an amount to accommodate the thickness of the tubular skirt so as to provide an overall uniform diameter for the container and closure assembly.

3. The galvanic cell of claim 1 wherein the container is encased in an outer cell assembly including an outer tubular jacket the upper end of which extends beyond the closure and is locked in engagement with the outer peripheral edge of a metallic top terminal cover plate and wherein a portion of the upper surface of the closure is shaped to contour fit with a portion of the internal surface of the metallic top terminal cover plate so as to provide an effectively large airspace above the depolarizer mix and below the closure.

4. The galvanic cell of claim 1 wherein the closure has at least one vent hole.

5. The galvanic cell of claim 1 wherein the closure is made of a material selected from the group consisting of polyethylene, polypropylene, rigid vinyl, polycarbonate, high impact polystyrene, copolymers made from acrylonitrile, butadiene and styrene, and nylon.

6. A galvanic cell comprising in combination a cylindrical container having an open end, an electrode comprising a depolarizer mix disposed within said container and separated therefrom by a separator, a current collector centrally embedded in said depolarizer mix, a terminal cap seated on the top of said current collector and having a radially outward flange depending from its lower end, and a closure covering the open end of said container, said closure having an opening at its center and a tubular skirt at its periphery and being disposed such that the upper portion of the current collector and the center portion of the terminal cap pass through said opening with the upper surface of the terminal cap flange seated against and adhesively secured to the bottom surface of the closure adjacent the center opening therein and the peripheral tubular skirt of the closure is disposed outside of and contacts and is adhesively secured to the upper rim at the open end of said container thereby providing a closure seal for said cell and wherein the thickness of said closure is between about 0.005 inch and about 0.06 inch.

7. The galvanic cell of claim 6 wherein said upper rim is inwardly crimped an amount to accommodate the thickness of the tubular skirt so as to provide an overall uniform diameter for the container and closure assembly.

8. The galvanic cell of claim 6 wherein the container is encased in an outer cell assembly including an outer tubular jacket the upper end of which extends beyond the closure and is locked in engagement with the outer peripheral edge of a metallic top terminal cover plate and wherein a portion of the upper surface of the closure is shaped to contour fit with a portion of the internal surface of the metallic top terminal cover plate so as to provide an effectively large airspace above the depolarizer mix and below the closure.

9. The galvanic cell of claim 6 wherein the closure has at least one vent hole.

10. The galvanic cell of claim 6 wherein the closure is made of a material selected from the group consisting of polyethylene, polypropylene, rigid vinyl, polycarbonate, high impact polystyrene, copolymers made from acrylonitrile, butadiene and styrene, and nylon.

* * * * *